United States Patent [19]
Harr

[11] 3,772,071
[45] Nov. 13, 1973

[54] LIQUID CONTAINER CELLS

[75] Inventor: George B. Harr, Pasadena, Calif.

[73] Assignee: The Firestone Tire & Rubber Company, Akron, Ohio

[22] Filed: Mar. 9, 1970

[21] Appl. No.: 24,453

Related U.S. Application Data

[60] Division of Ser. No. 787,300, Dec. 17, 1968, Pat. No. 3,616,189, which is a continuation of Ser. No. 413,763, Nov. 25, 1964, abandoned, which is a continuation of Ser. No. 357,499, April 6, 1964, abandoned.

[52] U.S. Cl............ 117/138.8 D, 117/72, 117/77, 117/98, 117/104 R, 117/161 KP, 117/161 P, 117/162

[51] Int. Cl................. B32b 27/08, B44d 1/08

[58] Field of Search............ 117/138.8 D, 72, 117/77, 98, 161 P, 161 KP, 162

[56] References Cited
UNITED STATES PATENTS

| | | | |
|---|---|---|---|
| 3,129,014 | 4/1964 | Hutchison et al. | 161/405 X |
| 2,715,085 | 8/1955 | Boyer | 161/405 X |
| 3,070,474 | 12/1962 | Miller | 117/138.8 X |
| 3,085,027 | 4/1963 | Porteous | 117/161 X |
| 2,626,882 | 1/1953 | Gerke | 161/405 X |
| 3,205,120 | 9/1965 | Flanders | 161/160 |
| 2,558,807 | 7/1951 | Bailey | 161/405 X |
| 2,713,550 | 7/1955 | Reid et al. | 161/405 X |

Primary Examiner—William D. Martin
Assistant Examiner—Sadie L. Childs
Attorney—Gordon C. Mack

[57] ABSTRACT

Fuel cells are made with cured nitrile rubber on the inner surface and cured polyurethane on the outer surface. A nylon barrier may be provided between the two. The polyurethane layer is preferably prepared by spraying a curing agent and polyurethane precursor through a nozzle which mixes the two.

4 Claims, 6 Drawing Figures

PATENTED NOV 13 1973 3,772,071

LIQUID CONTAINER CELLS

This application is a division of my application Ser. No. 787,300 filed Dec. 17, 1968, now U.S. Pat. No. 3,616,189, which is a continuation of my application, Ser. No. 413,763, filed Nov. 25, 1964 (now abandoned) which in turn is a continuation of my application, Ser. No. 357,499 filed Apr. 6, 1964 (now abandoned).

This invention relates to an improved fuel cell for automobiles, airplanes, boats, etc.

The fuel cell contains a nitrile rubber (butadiene-acrylonitrile copolymer) inner liner associated with a nylon film barrier and a polyurethane exterior. The fuel cell may be of the bullet-sealing type if desired.

All-polyurethane cells with and without a barrier of nylon between the plies thereof have been made. Difficulty has been experienced with those cell structures which provide an inner surface of polyurethane which is contacted by the fuel and with water present in the fuel. On prolonged contact with the fuel and/or with water in the fuel, the polyurethane degrades. Multiply polyurethane cells with barrier and single-ply cells of polyurethane have proven to be not sufficiently resistant to water to be satisfactory, and on prolonged use they have a tendency to degrade and/or may delaminate. Fuel cells with polyurethane inner liners generally will not comply with current U. S. Military specifications. The fuel cell of this invention overcomes these difficulties.

The fuel cell of this invention contains a compounded nitrile polymer inner liner. It includes an outer ply of poly-urethane, an inner ply of a nitrile rubber, and a nylon barrier between these. In some cases the nylon barrier may be omitted. The cell walls are generally sufficiently flexible to permit collapsing for installation, yet possess a degree of spring-back. An extended application would be to encase the exterior with a poly-urethane compound having sufficient rigidity to be semi-rigid or self-sustaining. A further useful type of cell includes a sealant ply for self-sealing tanks for the military.

The cell may be built up in any suitable manner. For instance, the cell may be built by plying up tailored sheets of the (several) laminae upon a building form. Alternatively, one or more of the plies may be built up by application of them as liquids to a form, this being described in the case of polyurethane laminae in Hutchison et al. Ser. No. 60,975 filed Oct. 6, 1960 which has matured into U.S. Pat. No. 3,129,014 issued Apr. 14, 1964, or they may be individually preformed. The nitrile rubber and nylon barrier layers (this latter may in some cases be omitted) may also be applied as a liquid, as by brushing, spraying, etc., these materials in liquid form, e.g. as solutions, dispersions, etc., to a preformed ply or sprayed coat of the nitrile rubber. Generally, an adhesive bond, a primer, is applied between the plies. The assembled cell is then heated, with or without accompanying applied pressure, to cure these elastomers, cements and plastics and to simultaneously bond the several plies together.

The nitrile rubber is fuel-and-water-resistant when cured. This ply is composed essentially of a copolymer of a major portion of butadiene and a minor portion of acrylonitrile, usually in the ratio of about 75/55 per cent of butadiene to 25/45 per cent of acrylonitrile. Such rubbers are available commercially under such names as Butaprene N, Chemgum N, Hycar and Paracril. The curing of these rubbers with sulfur, etc. is well known in the art.

The polyurethane may be obtained from a variety of different precursors. That known as Adiprene L–100 is a fully saturated polymer which contains 4.0 to 4.3 per cent of isocyanate groups, by weight, the balance being at least largely a polytetra-methylene ether glycol of medium chain length of about 30 to 40 oxygen atoms reacted with tolylene isocyanate.

Adiprene L–167 is of like composition but contains 6.2 to 6.5 per cent isocyanate content. Other polyurethane precursors which may be used would be Multrathane, Adiprene LD–315, etc.

To the polyurethane precursor are added curing agents and modifying agents. Suitable curing agents are amine-type compounds such as methylene dianiline, diamino pyridine, tri-ethylene tetramine, hexamethylene diamine and the like. Also beneficial are modifying agents, such as phenoxy resins of the Bisphenol A/epichlorhydrin variety. These latter two materials serve the dual purpose of increasing the deposited film viscosity to permit depositing thicker films without difficulties from sagging and in part serving as cross-linking agents in the curing of the polyurethane rubber. Typical additives are as follows:

| TECHNICAL NAME | TRADE NAME | SOURCE |
|---|---|---|
| 4,4'-Methylene-bis(2-chloroaniline) | MOCA | DuPont* |
| Diaminodiphenylsulfone | | |
| Diaminodiphenylamine | | |
| 4,4'-Diaminobenzophenone | | |
| Diaminopyridine | | |
| Meta-phenylenediamine | | |
| | Curing Agent Z | Shell** |
| Cumenediamine and m-phenylenediamine | DPI-7 | |
| Liquid Polyamide | Versamid-100 | General*** |
| Liquid Polyamide | Versamid-115 | General*** |
| Liquid Polyamide | Versamid-125 | General*** |
| Hexamethylenetetramine | | |
| Triethylenetetramine | | |

*E. I. duPont deNemours & Company.
**Shell Chemical Corporation.
***General Mills Co.

Other curing agents including polyols (such as castor oil, 1,4-butanediol, 1,2,6-hexatriol, trimethyltolpropane, triethanolamine, N,N,N',N'-tetrakis(2-hydroxypropyl)ethylenediamine, methyldi-ethanolamine and the like and combinations thereof), moisture and a miscellaneous list of catalysts, including lead and cobalt naphthenates, potassium acetate, titanate esters, etc. The precursor is preferably a linear polyether similarly terminated with a small percentage of isocyanate groups. The method of manufacturing polyurethane, the precursors and the curing agents are all well known in the art.

Nylons suitable for use in the barrier film are of two types—alcohol soluble resins, such as DuPont's Zytel 61 and Zytel 61P, which are presumed to be of the 6/610/6 variety, or Belding Corticelli Industrie'3 800 series nylon resins, which are methoxy-methylated nylon. These may have average molecular weights of 20,000 to 25,000 with melting points of 130° to 150° C. Alternatively, nylon film prepared from injection molding grade nylon of either Type 66 or a variety of modified Type 6, such as Fosta Grant nylon film, may be used.

The sealant used to make the tank bullet-sealing may be of any usual type. Frequently these compositions employ a mixture of natural rubber and styrenebutadiene synthetic rubber in a compound exhibiting a very low state of cure. The state of cure is such that it does not interfere with the swelling of the sealant when exposed to fuel as a result of the passage of a projectile through the cell wall.

The composite is vulcanized and otherwise cross-linked, utilizing a heat and pressure system representing a delicate balancing of that required by the nitrile inner liner, the primer cements and the polyurethane outer ply. Temperatures ranging as high as 315° F. have been employed.

The shape of the cell is not critical. It will be provided with any suitable opening for filling, and connections for supplying the fuel as required. The nylon barrier will usually be thin, about 0.001 to 0.002 inch. The polyurethane will usually range from 0.015 to 0.035 inch thick, depending on utilization, or somewhat thicker. Usually the nitrile rubber will be no thicker than about 0.02 inch thick, preferably on the order of 0.008 inch. The over-all thickness of the cell walls will usually be about 0.030 to 0.060 inch, and up to 0.18 inch for self-sealing cells.

The invention is more particularly illustrated in the drawing, wherein the several figures are cross-sectional views of portions of cell walls constructed in accordance with this invention, the composition of the several laminae in each figure being indicated by legends.

In the drawing

Figure 1:
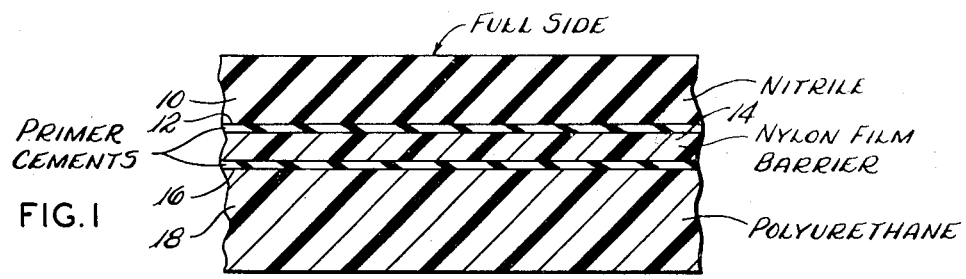
FIG. 1 is a section through a cell wall in which there is a nylon barrier but no fabric.

FIG. 1 illustrates one embodiment of the invention comprising an innermost lamina 10 of a nitrile rubber on the inner, fuel-contacting side of a fuel cell, this inner lamina 10 being bonded by means of a prime cement layer 12 to a continuous, non-porous nylon film barrier lamina 14. This lamina 14 is, in turn, bonded by means of a second primer cement layer 16 to an outermost supporting and encapsulating lamina 18 of a polyurethane elastomer. In the construction of a fuel cell embodying a wall of this construction, there will be provided a suitable building form having a surface conforming to the contour of the fuel cell to be constructed and being of such material as to accept the building of plies thereon. In one embodiment, sheets of uncured nitrile rubber composition containing the usual vulcanizing agents, pigments, etc. tailored to conform to the building form are plied upon the form, and all seams between the tailored pieces carefully closed and rolled down, this ply being the nitrile rubber ply 10 of FIG. 1. Thereafter, a solution of a primer cement 12 is applied onto the nitrile rubber lamina 10 and dried. The purpose of this primer cement is to insure the highest possible order of adhesion between the nitrile rubber and the nylon barrier lamina, such cements being known in the art, but in some cases it may be omitted. After the primer cement is applied, a solution of nylon is applied over the primer cement layer 12 and dried, in order to form the impervious nylon film barrier 14. After the drying of the nylon film barrier 14, a second coat 16 of primer cement is applied over the nylon film barrier 14 and allowed to dry. Finally there is sprayed upon the second primer cement layer 16 a liquid polyurethane composition capable of setting up and curing to form the outermost structural and encapsulating layer 18. In accordance with one suitable mode of application, the liquid poly-urethane composition is supplied as two separate components—(I) a curing agent and phenoxy resin system and (II) a liquid polyurethane precursor—which are mixed in a dual component spray gun immediately before being projected upon the surface of the fuel cell under construction. The two separate components may be as follows:

(I) Curing agent and Phenoxy Resin Cross-Linking System

| | |
|---|---|
| Methylene Dianiline | 39.6% |
| Estane 5740X2 Polyurethane | 39.6% |
| Phenoxy Resin PKDA 8500 | 11.9% |
| Dianisidine Diisocyanate | 1.0% |
| Methyl Ethyl Ketone | 36.4% |
| Methyl Isobutyl Ketone | 7.9% |

The polyurethane (II) may be, for example, Adiprene L–100, which was described hereinabove on page 3 of this specification. This composition is quite desirable as it enables the spraying of laminae of fairly substantial thickness without sagging. Typically, the nitrile rubber inner layer 10 would have a thickness of 0.008 inch, the primer cement layers 12 and 16 thicknesses of 0.001 inch, the nylon film barrier 14, a thickness of 0.002 inch, and the polyurethane lamina a thickness of 0.010–0.030 inch. After construction of the above described composite cell, solvent is allowed to evaporate from the polyurethane layer 18 and the entire assembly is then subjected to heat-curing in a pressure vulcanizer in an atmosphere of air at temperatures on the order of 280°–290° F. in order to cure the several laminae. It will be seen that the mode of construction of the fuel cell is quite inexpensive and simple, and the resultant fuel cell has excellent abrasion resistance, tear resistance, puncture resistance, and low-temperature flexibility. The interior of the cell is highly resistant to deterioration from fuel and water contained in the cell.

The polyurethane precursor may be a polyether in which the percentage of isocyanate groups may be larger or smaller. A suitable composition is the well-known Adiprene L–100 which is a fully saturated polymer which contains 4.0 to 4.3 per cent of isocyanate groups, by weight, the balance of the molecule being, at least largely, polytetramethylene ether glycol of medium chain length of about 30 to 40 oxygen atoms. This is reacted with a diisocyanate to produce the precursor.

A rapid curing agent is used, such as MOCA which is 4,4'-methylene-bis(2-chloroaniline). This is mixed with the precursor in the spray gun, together with the viscosity builder. A good viscosity builder is a soluble thermoplastic copolymer of Bisphenol A and epichlorhydrin. This will cross link with the precursor. A small amount of a soluble thermoplastic poly-urethane may be added, together with sufficient diisocyanate to cure it. A suitable formula for 100 parts of Adiprene L–100 precursor is:

CURING AGENT: parts

| | |
|---|---|
| MOCA | 14.3 |
| VISCOSITY BUILDER: | |
| Soluble thermoplastic polyurethane | 1.02 |
| Dianisidine diisocyanate | 0.37 |
| Thermoplastic copolymer of Bisphenol A and epichlorhydrin | 5 |
| SOLVENTS: | |
| Ethyl acetate | 5.7 |
| Methylethyl ketone | 13.2 |
| Methylisobutyl ketone | 2.69 |

The various components are mixed in the spray gun and sprayed on to the surface of the cellular interior. The sprayed coating cures rapidly at room temperature.

Figure 2:
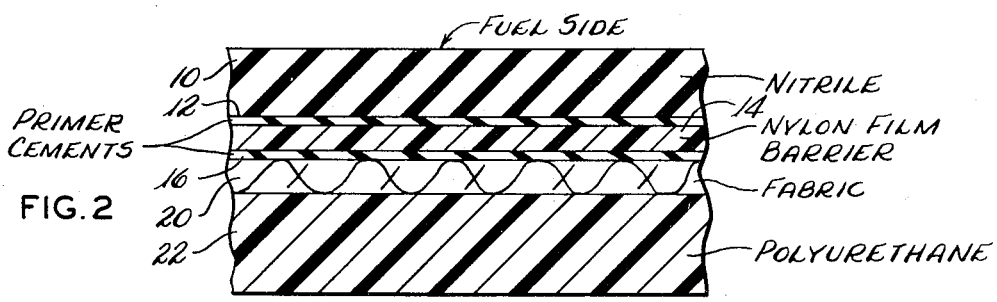
FIG. 2 is a section through a cell wall showing both a nylon barrier and fabric.

FIG. 2 shows another modification of this invention comprising, as before, a nitrile rubber layer 10 on the interior side of the wall, primer cement layers 12 and 16, and nylon barrier film 14. However, at this point there is introduced a fabric-reinforced elastomer ply 20 and superimposed upon this lamina a final polyurethane lamina 22. The method of construction of this fuel cell may follow the same procedure as in the case of FIG. 1 up to the application and drying of the primer cement lamina 16. At this point there is applied to the structure on the form tailored sheets of fabric 20 which may or may not be impregnated with a suitable elastomer, either polyurethane or nitrile rubber. Finally, a liquid polyurethane composition similar to that employed in FIG. 1 is sprayed upon the entire structure to form the outermost lamina 22, and the entire assembly cured as in the case of FIG. 1. In the case where the fabric 20 is not already impregnated, the polyurethane composition strikes through to impregnate the fabric and bond to the substrate.

Figure 3:
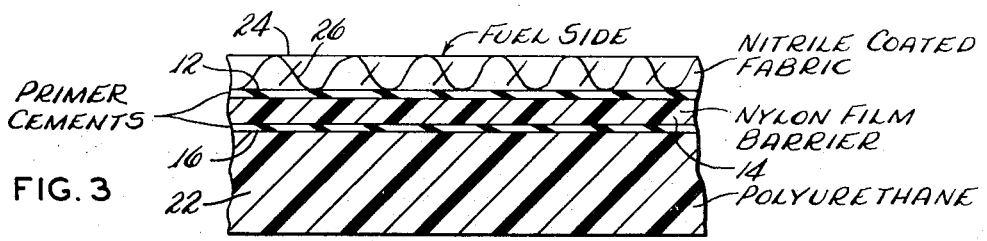
FIG. 3 is a section through a cell wall in which the fuel side is nitrile-coated fabric.

FIG. 3 is identical with FIG. 1 except that, instead of a simple non-reinforced innermost nitrile rubber layer 10, there is employed a nitrile rubber composition sheet 24 containing a fabric reinforcement 26 embedded therein. The method of construction, curing, etc. is identical as in the case of FIG. 1. The fabric reinforcement 26 in FIG. 3 serves the same purpose of imparting additional strength and rigidity as the fabric reinforcement in the lamina 20 of FIG. 2.

Figure 4:
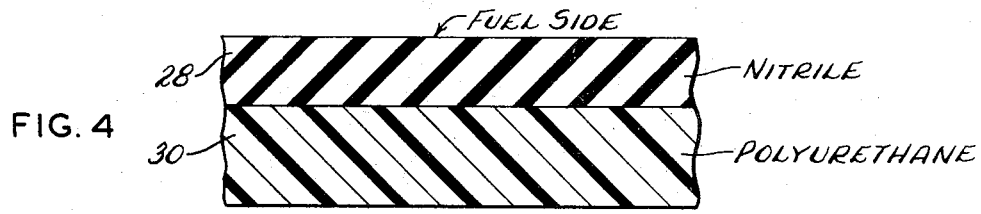
FIG. 4 is a section through a cell wall in which no nylon barrier is used.

FIG. 4 represents the invention in its simplest form, wherein a nitrile rubber lamina 28 on the interior side of the fuel cell is laminated directly to a polyurethane rubber exterior lamina 30. In this case the nitrile rubber layer 28 is formed similarly to the lamina 10 in FIG. 1 by plying sheets of a nitrile rubber upon a form. Thereafter the polyurethane lamina 30 is sprayed upon the exterior surface of the nitrile rubber lamina 28 and the entire assembly cured as in the case of FIG. 1.

Figure 5:
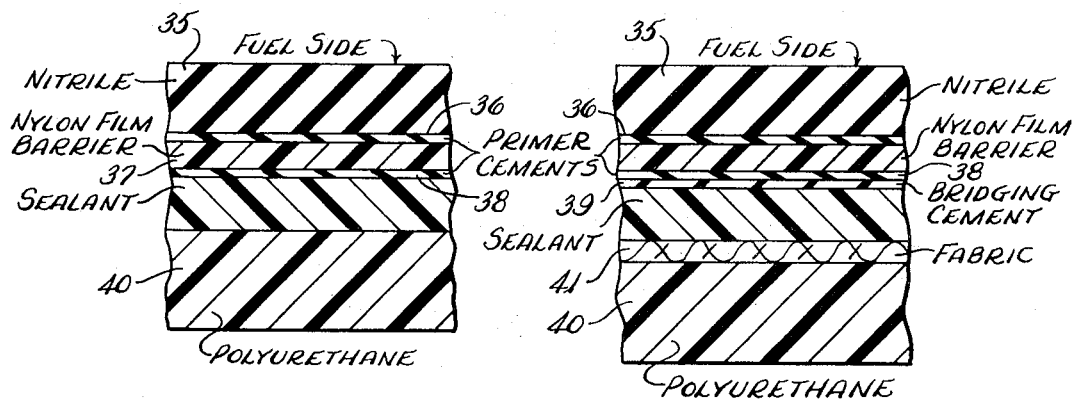
FIG. 5 is a section through a cell wall in which sealant is interposed between the outer polyurethane coating and the nylon barrier.
Figure 6:
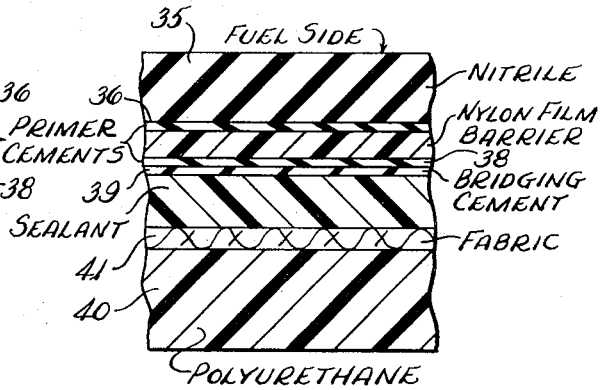
FIG. 6 is a section through a cell wall of similar construction but utilizing cloth between the sealant and the outer covering of polyurethane.

The cell walls shown in FIGS. 5 and 6 include a sealant ply. The location of the sealant is optional except that in tanks of the type contemplated by the industry at this time, the sealant is located outside of the nylon barrier. The cement shown between the nylon barrier and sealant may not be necessary, and if a cloth lamina is employed its location may be varied. It may, for example, be interposed between two sealant laminae or it may be interposed between the sealant and the polyurethane exterior. Adhesives will be used as required.

In the wall of FIG. 5, the nitrile liner 35 constitutes the interior of the fuel tank. This nitrile liner is prepared with primer cement 36 to accept the nylon barrier 37 which is applied in the form of a solution which dries to form a fuel-impervious film barrier. After the nylon barrier 37 is properly dried, a second primer cement 38 is applied and allowed to dry. A third cement 39 is a bridging cement applied on top of cement 38 to insure adherence of the sealant to the nylon. The fuel-swelling sealant is then applied to the build-up and this may be a single layer as shown, or it may be composed of several layers, according to the level of gun-fire protection desired. The final encasement of this fuel-tank construction is accomplished by applying an outer polyurethane casing 40, said casing being particularly resistant to the shattering effect of the impact of projectiles. In addition, the outer polyurethane casing or integument possesses the characteristic of snap-back which realigns the lips of inflicted wounds; this realignment is particularly necessary in the proper functioning of bullet-sealing fuel tanks.

FIG. 6 is quite similar to FIG. 5 with the exception that a cloth layer 41 is interposed between the sealant ply and the outer polyurethane ply.

In the self-sealing tanks, the polyurethane forms a particularly desirable outer ply (not necessarily at the surface of the cell) because when pierced by a projectile, the poly-urethane does not shatter or tear (as does cloth alone and other materials of the prior art). Also the polyurethane imparts exceptional snap-back to the entire self-sealing construction, thereby realigning the lips of the wound, permitting the sealant to perform in optimum fashion.

It is understood that FIGS. 5 and 6 typify only two of a number of possible variations, but the approaches shown here do include the basics of all constructions employing an inner liner, a nylon barrier, a sealant, and an outer casing, all joined with suitable cements.

I claim:

1. The process of constructing a fuel cell which comprises covering a building form with sheets of a vulcanizable butadiene-acrylonitrile rubber composition and thereafter forming an outer layer outside of this rubber composition by mixing a curing agent and a liquid polyurethane precursor and immediately spraying the mixture over the inner portion of the cell comprising the vulcanizable nitrile rubber composition, and then heating and curing the nitrile rubber and the polyurethane.

2. The process of claim 1 in which the liquid polyurethane precursor includes a viscosity builder which is a copolymer of Bisphenol A and epichlorhydrin.

3. The process of claim 1 in which the mixture of the curing agent and polyurethane are sprayed directly on to the vulcanizable nitrile rubber composition.

4. The process of claim 1 in which a nylon barrier is sprayed over the butadiene-acrylonitrile rubber composition before said outer layer is applied and a primer cement is applied immediately before and immediately after the application of the nylon to adhere the nylon to the butadiene-acrylonitrile rubber and the polyurethane.

* * * * *

PO-1050
(5/69)

UNITED STATES PATENT OFFICE
CERTIFICATE OF CORRECTION

Patent No. 3,772,071  Dated November 13, 1973

Inventor(s) George B. Harr

It is certified that error appears in the above-identified patent and that said Letters Patent are hereby corrected as shown below:

In Column 1, Line 22, "Multiply" should be --Multi-ply--.

In Column 1, Line 33, "poly-urethane" should be --polyurethane--.

In Column 2, Line 8, "polytetra-Methylene" should be --polytetramethylene--.

In Column 2, Line 18, "tri-ethylene" should be --triethylene--.

In Column 2, Line 46, "methyldi-ethanolamine" should be --methyldiethanolamine--

In Column 2, Line 51 and Line 52, "grou-ps" should be --groups--.

In Column 2, Line 58, "Industrie'3" should be --Industries'--

In Column 2, Line 64, "Fosta Grant" should be --Foster Grant--.

In Column 4, Line 11, "poly-urethane" should be --polyurethane--.

In Column 4, the table, Line 2, the amount for "Estane 5740X2 Polyurethane" should be -- 3.2% -- not "39.6%".

In Column 4, Line 63, "poly-urethane" should be --polyurethane--.

In Column 5, in the table, under "SOLVENTS" "Methylethyl ketone" should be --Methyl ethyl ketone--.

In Column 6, Line 27, "poly-urethane" should be --polyurethane--.

Signed and sealed this 14th day of January 1975.

(SEAL)
Attest:

McCOY M. GIBSON JR.
Attesting Officer

C. MARSHALL DANN
Commissioner of Patents